Patented Nov. 11, 1941

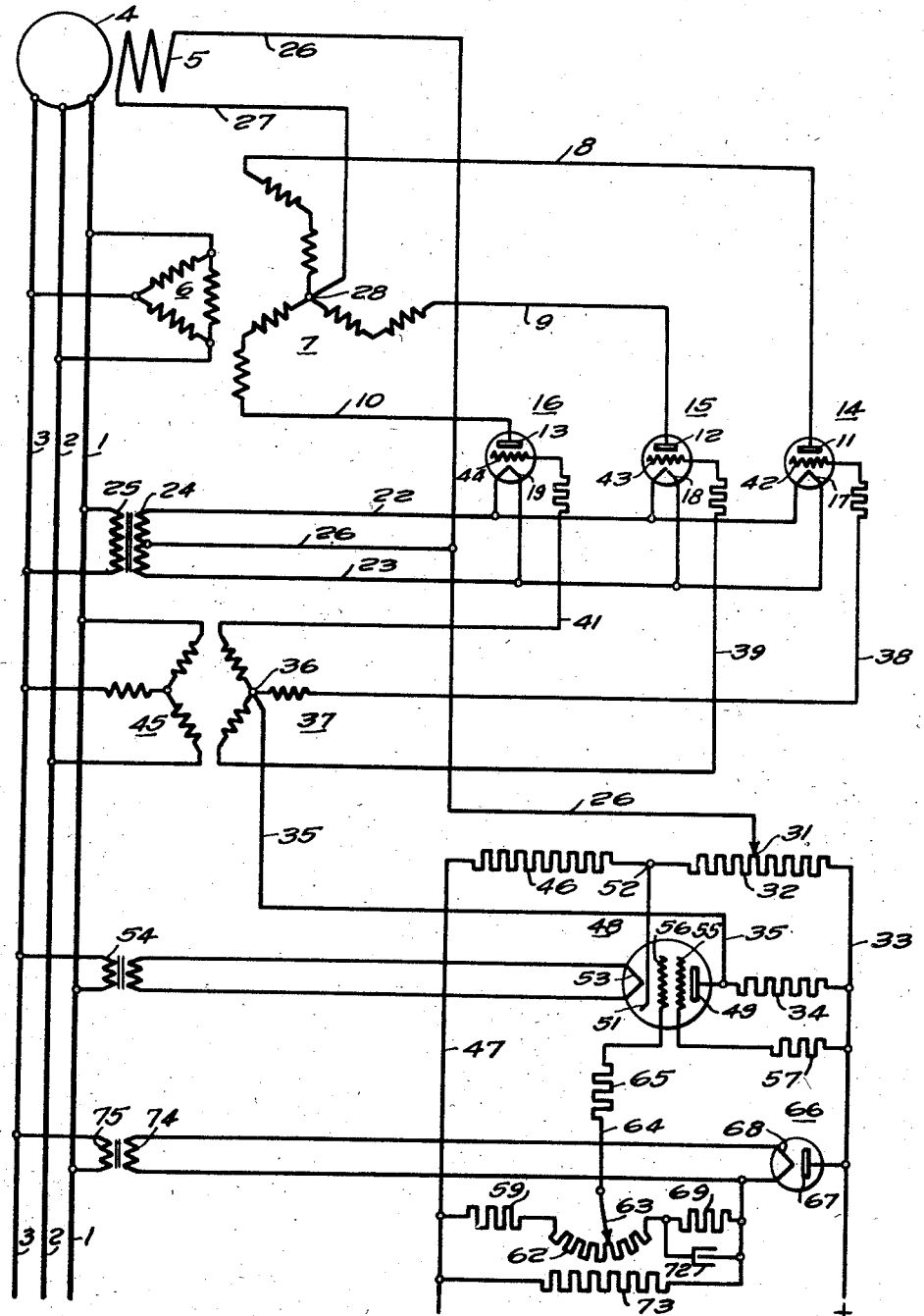

2,261,982

UNITED STATES PATENT OFFICE 2,261,982

VOLTAGE AMPLIFYING APPARATUS

Donald W. Exner, Forest Hills, Pa., assignor to Westinghouse Electric & Manufacturing Company, East Pittsburgh, Pa., a corporation of Pennsylvania Application February 16, 1940, Serial No. 319,318

5 Claims. (Cl. 171—312)

My invention relates to electronic apparatus and control circuits therefor and is particularly applicable to electronic regulators having a direct current amplifier between a voltage measuring device and a controlled source of supply of energy to the field winding of a generator or similar device.

In such equipment, the amplifier tubes ordinarily require a more or less fixed negative direct current bias on the control grid so that the operation of the tube will occur normally in the region of negative grid voltage. This causes the amplifier to operate without drawing grid current so that the tube may be controlled by a low energy source. This arrangement also minimizes plate current losses.

In the past, it has been customary to provide a separate source of unidirectional potential such as a battery or a rectifier and filter to obtain this negative grid bias. Such arrangements require a source of energy separate from that supplying the plate power for the amplifier. Since this negative bias voltage has heretofore been of a substantially fixed value, variations in vacuum tube characteristics have caused a marked variation in the value of the regulated voltage, since the tube output is not determined solely by grid potential but also largely by tube characteristic.

It is an object of my invention to provide an electronic regulator system employing a direct current grid controlled amplifier, together with means for developing a negative grid bias component of voltage therefor without the necessity for providing a source of grid bias potential separate from that supplying the anode current of the amplifier.

Another object of the invention is the provision of means for controlling an amplifying tube of the character indicated by a grid bias that is a function of tube current to thereby compensate the tube activity for changing tube characteristics.

It is a more specific object of the invention to provide an electronic system employing an amplifier tube, the operation of which is determined in part by the voltage drop across a resistor through which the anode current of the tube passes and, in part, by the voltage drop across a resistor that varies as a function of the regulated quantity and which two operating forces act in opposition.

It is a further object of the invention to limit the opposing effects of the tube component voltage parts above referred to so that a small driving voltage only is required from the voltage measuring device controlling the amplifier tube.

Other objects and advantages of the invention will be apparent from the following description of a preferred embodiment of the invention, reference being made to the single figure of the drawing, which illustrates circuits and apparatus comprising one embodiment of the invention.

In the drawing, a three-phase circuit is illustrated comprising main circuit conductors 1, 2 and 3 that are connected to be supplied with energy from an alternating current generator 4 having a field winding 5. The phase-sequence of these conductors is assumed to be 1—2—3 in the following description. The field winding is supplied with energy from rectifier units supplied from circuit conductors 1, 2 and 3 through an anode transformer having a three-phase primary winding 6 connected to the circuit and a secondary winding 7 connected in zigzag Y, and from the outer terminals of which conductors 8, 9 and 10 are connected to anodes 11, 12 and 13, respectively, of rectifier tubes 14, 15 and 16. The rectifier tubes 14, 15 and 16 are provided with cathodes 17, 18 and 19, respectively, that are connected by means of conductors 22 and 23 to the secondary winding 24 of a filament transformer, the primary winding 25 of which is connected to the circuit conductors 1 and 3. The circuit for supplying energy to the field winding 5 extends from the cathodes 17, 18 and 19 of the tube rectifiers through conductors 22 and 23, the secondary winding 24 of the filament transformer, conductor 26, field winding 5, conductor 27 to the neutral point 28 of the anode transformer winding 7 and through the three branch circuits represented by conductors 8, 9 and 10 to the anodes 11, 12 and 13 of tubes 14, 15 and 16. The grid control circuit for the tubes 14, 15 and 16 extends from the cathodes 17, 18 and 19 through conductors 22 and 23, the filament transformer winding 24, conductor 26 to a sliding contact member 31 that engages a selected point along a resistor 32, that is connected to a positive conductor 33 of a source of unidirectional potential, through resistor 34, conductor 35 to the neutral point 36 of a Y-connected winding 37 constituting the secondary of phase-shifting transformer, through the branches of the Y and conductors 38, 39 and 41 to grids 42, 43 and 44, respectively, of tubes 14, 15 and 16. The phase-shifting transformer is also provided with a three-phase primary winding 45 connected to the circuit conductors 1, 2 and 3.

The resistor 32 serves as a bleeder resistor connected in series with a resistor 46 between the positive conductor 33 and a negative conductor 47 of a unidirectional voltage source. An amplifier tube 48 is provided having an anode 49 connected to the end of resistor 34 remote from the conductor 33, and a cathode 51 connected to a junction point 52 between the bleeder resistor 32 and the resistor 46 so that the tube current flows between conductors 33 and 47 in shunt relation to the resistor 32 and in series relation with the resistor 46. The tube 48 is provided with a heater element 53 for heating the cathode 51, which heater element is connected through a filament transformer 54 to conductors 1 and 2 of the generator output circuit. The tube 48 is also provided with a screen grid 55 and a control grid 56. The screen grid 55 is connected through a resistor 57 to the positive conductor 33 of the previously mentioned unidirectional voltage source. The grid circuit for the control grid 56 extends from cathode 51 through the resistor 46, conductor 47, resistor 59, a potentiometer resistor 62 and from a selected point thereon determined by the position of the contact member 63 through conductor 64 and resistor 65, to the control grid 56.

A detector tube 66 is provided for controlling a circuit extending from the positive terminal 33 to the negative terminal 47 of the previously mentioned unidirectional voltage source, and comprises an anode 67 connected to the conductor 33 and a cathode 68 that is connected through a network including a resistor 69 and condenser 72 in parallel circuit relation, the two previously mentioned resistors 62 and 59 in series relation, and a resistor 73 that is connected in parallel circuit relation to the previously named portion of the network. The tube 66 is of the diode hot filament type in which the conductivity of the tube is determined by the temperature of the cathode 68 which is connected by a filament transformer having a secondary winding 74 and a primary winding 75 to line circuit conductors 2 and 3 for heating the cathode 68 in accordance with the voltage of the power circuit conductors.

If the system is in operation and the voltage supplied by the generator 4 is at the desired value, the current flowing from conductor 33 to conductor 47 through the detector tube 66, which is a measure of the voltage of the line conductors of the power circuits 2 and 3, will be just sufficient to establish the correct bias on the grid 56 of the amplifier tube 48 to maintain the desired current flow through the rectifier tubes 14, 15 and 16 and the field winding 5 of the generator 4 for maintaining the desired voltage on the power circuit conductors for the existing conditions on the system. If the voltage of the power circuit conductors 2 and 3 increases above the desired value, this increased potential is impressed through the filament transformer windings 75 and 74 and the filament 68 of the detector tube 66, thus increasing the current flow through the tube and through the network including resistors 62 and 59, to increase the voltage drop between the points 63 and conductor 47 which decreases the negative bias of the grid 56 and causes the amplifier tube 48 to become more conducting, thus causing an increase in the flow of current from the positive conductor 43 through resistor 34, to the tube anode 49 and from the tube cathode 51 through resistor 46 to the negative conductor 47. The increase in current flow through the resistor 34 increases the negative bias on the grids 42, 43 and 44 of the tube rectifiers 14, 15 and 16 in the above traced grid control circuit, causing the rectifier tubes 14, 15 and 16 to pass less current to the field winding 5 and thus to decrease the voltage of the generator 4. At the same time, the increase in current flow through the tube 48 increases the voltage drop across the resistor 46 to slightly increase the negative bias on the control grid 56. It will be noted that the resistor 46, connected as above described, not only provides a negative grid bias for the control grid 56 of the amplifier tube 48 by the voltage drop across it resulting from the constant flow of current through the bleeder resistor 32 but that this voltage drop is modified by the flow of plate and screen current from the tube cathode 51 through the resistor 46. The resistor 32 is chosen to have a value of resistance such that the current therethrough will be considerably greater than the plate and screen current through the tube 48, thus causing the voltage drop across the resistor 46 to vary to a less degree than the variations in the plate and screen current of the tube so that for a change in conductivity of the detector tube 66, the voltage drop between conductor 47 and the contact member 63 will vary to a greater degree than the voltage drop across the resistor 46. This prevents the voltage drop across the resistor 46 from too greatly bucking the voltage drop between conductor 47 and point 46 so that a smaller change in voltage applied to the measuring device 66 is required to effect a correction in the value of the regulated voltage from its desired value. If the voltage of the power circuit 1, 2, 3 decreases below its desired value, the opposite result will be effected, namely, the voltage applied to the filament cathode 68 of the voltage measuring tube 66 will be reduced, causing the conductivity of the tube to be decreased and the flow of current through the tube and the network including resistors 62 and 59 to be likewise decreased, thus increasing the negative bias on the grid 56 of the amplifier tube 48 and decreasing the flow of current through this tube. The decrease in the flow of current through the tube 48 likewise decreases the current flow through resistors 34 and 46 in series with the tube, the former decreasing the negative bias on the grids of tubes 14, 15 and 16 to cause them to supply a greater current to the field winding 5 of the generator 4, and the latter decreasing the drop across the resistor 46.

Since the voltage drop across the resistor 46 changes in part as the result of changing current flow through the amplifier tube 48, variation in this component of grid bias voltage partially overcomes variations in the component of grid bias voltage between conductor 47 and the contact 63 constituting the tap on the potentiometer resistor 62. If the initial characteristic of the amplifier tube 48 should change, for example, due to partial loss of emission from the cathode, thus causing a decrease in plate and screen current thereto, the resulting decrease in the component of grid bias voltage developed across the resistor 46 would cause a net change in grid voltage in a direction to increase the conductivity of the tube 48. By a proper selection of the various resistors included in the circuits, this effect may be made quite pronounced so that the regulated voltage cannot vary appreciably from the desired value as a result of changes in the tube characteristics. As this effect is increased, however, a greater driving voltage is required on the voltage measuring device or detector tube 66 so as to cause a greater variation in the voltage drop between conductor 47 and the contact member 63 for the same change in generator voltage. Sufficient current is permitted to pass through the bleeder resistor 32 to limit the bucking effect of the voltage drop across the resistor 46 and thus make the circuit more sensitive to changes in the regulated voltage than it otherwise would be.

Many modifications in the circuits and apparatus illustrated and described will occur to those skilled in the art and I do not wish to be limited otherwise than by the scope of the appended claims.

I claim as my invention:

1. In an electronic regulator for controlling the characteristic of an electric circuit, in combination, an electric circuit to be regulated, grid controlled electronic means for governing said characteristic, a source of unidirectional voltage energy, an amplifier tube connected to said source, a resistor connected in series with said tube between the tube and the positive terminal of said source and a resistor connected in series with said tube between the tube and the negative terminal of said source, one of said resistors being included in the grid circuit of said grid controlled electronic means and the other of said resistors being included in the grid circuit of said amplifier tube, a second resistor included in the grid circuit of said amplifier tube and connected to said unidirectional voltage source in a direction to develop a voltage component in the grid control circuit of said amplifier tube that is of opposite polarity to that developed across the first named resistor in the grid circuit, and a detector tube responsive to the said controlled characteristic connected in series with said last named resistor.

2. In an electronic regulator for controlling the characteristic of an electric circuit, in combination, an electric circuit to be regulated, grid controlled electronic means for governing said characteristic, a source of unidirectional voltage energy, an amplifier tube connected to said source, a resistor connected in series with said tube between the tube and the positive terminal of said source and a resistor connected in series with said tube between the tube and the negative terminal of said source, one of said resistors being included in the grid circuit of said grid controlled electronic means and the other of said resistors being included in the grid circuit of said amplifier tube, a second resistor included in the grid circuit of said amplifier tube and connected to said unidirectional voltage source in a direction to develop a voltage component in the grid control circuit of said amplifier tube that is of opposite polarity to that developed across the first named resistor of the grid circuit, a detector tube responsive to the said controlled characteristic connected in series with said last named resistor, and a circuit connection in shunt to said amplifier tube and in series with the first named resistor of said amplifier tube grid circuit.

3. In an electronic regulator for controlling the characteristic of an electric circuit, in combination, an electric circuit to be regulated, grid controlled electronic means for governing said characteristic, a source of unidirectional voltage energy, an amplifier tube connected to said source, a resistor connected in series with said tube between the tube and the positive terminal of said source and a resistor connected in series with said tube between the tube and the negative terminal of said source, one of said resistors being included in the grid circuit of said grid controlled electronic means and the other of said resistors being included in the grid circuit of said amplifier tube, a second resistor included in the grid circuit of said amplifier tube and connected to said unidirectional voltage source in a direction to develop a voltage component in the grid control circuit of said amplifier tube that is of opposite polarity to that developed across the first named resistor of the grid circuit, a detector tube responsive to the said controlled characteristic connected in series with said last named resistor, and a circuit between the terminals of said source including a resistor in the grid circuit of said grid controlled electronic means and the first named resistor in the grid circuit of said amplifier tube.

4. In an electronic regulator for controlling the characteristic of an electric circuit, in combination, an electric circuit to be regulated, grid controlled electronic means for governing said characteristic, a source of unidirectional voltage energy, an amplifier tube connected to said source, a resistor connected in series with said tube between the tube and the positive terminal of said source and a resistor connected in series with said tube between the tube and the negative terminal of said source, one of said resistors being included in the grid circuit of said grid controlled electronic means and the other of said resistors being included in the grid circuit of said amplifier tube, a second resistor included in the grid circuit of said amplifier tube and connected to said unidirectional voltage source in a direction to develop a voltage component in the grid control circuit of said amplifier tube that is of opposite polarity to that developed across the first named resistor of the grid circuit, a detector tube responsive to the said controlled characteristic connected in series with said last named resistor, and a circuit between the terminals of said source including a bleeder resistor and the first named resistor in the grid circuit of said amplifier tube.

5. In an electronic regulator for controlling the characteristic of an electric circuit, in combination, an electric circuit to be regulated, grid controlled electronic means for governing said characteristic, a source of unidirectional voltage energy, an amplifier tube connected to said source, a resistor connected in series with said tube between the tube and the positive terminal of said source and a resistor connected in series with said tube between the tube and the negative terminal of said source, one of said resistors being included in the grid circuit of said grid controlled electronic means and the other of said resistors being included in the grid circuit of said amplifier tube, a second resistor included in the grid circuit of said amplifier tube, and connected to said unidirectional voltage source in a direction to develop a voltage component in the grid control circuit of said amplifier tube that is of opposite polarity to that developed across the first named resistor of the grid circuit, a detector tube responsive to the said controlled characteristic connected in series with said last named resistor, and a circuit between the terminals of said source including a bleeder resistor and the first named resistor in the grid circuit of said amplifier tube, the bleeder resistor having such value that its current is considerably greater than the current from the amplifier tube.

DONALD W. EXNER.